Patented Nov. 11, 1952

2,617,739

UNITED STATES PATENT OFFICE 2,617,739

PLASTICIZED AND STABILIZED LOWER FATTY ACID ESTER OF CELLULOSE

Edward J. Wickson, South Orange, William J. Myles, Summit, and William B. Horback, Irvington, N. J., assignors to Celanese Corporation of America, New York, N. Y., a corporation of Delaware No Drawing. Application November 10, 1949, Serial No. 126,692

2 Claims. (Cl. 106—179)

This invention relates to thermoplastic compositions and relates more particularly to thermoplastic compositions having a basis of cellulose acetate or other lower fatty acid ester of cellulose containing 3 to 5 carbon atoms in the acid radical.

An important object of this invention is the provision of a thermoplastic composition having a basis of cellulose acetate or other organic acid ester of cellulose which will be stable at elevated temperatures.

A further object of this invention is the provision of a thermoplastic composition having a basis of cellulose acetate or other lower fatty acid ester of cellulose containing 3 to 5 carbon atoms in the acid radical and containing a plasticizer having an ether linkage which is stabilized with paracyclohexyl phenol.

Other objects of this invention will be apparent from the following detailed description and claims.

When thermoplastic compositions having a basis of cellulose acetate or other lower fatty acid ester of cellulose containing 3 to 5 carbon atoms in the acid radical and containing a plasticizer are subjected to elevated temperatures during the processing, preparation and use thereof, there is a tendency for the thermoplastic compositions to become degraded and suffer a loss in viscosity, strength and other physical characteristics. It has been found that this degradation is especially marked when the thermoplastic compositions contain as a plasticizer an organic compound having an ether linkage, being sufficient in some cases to render the thermoplastic compositions non-acceptable for certain commercial applications.

We have now discovered that the degradation at elevated temperatures of the thermoplastic compositions having a basis of cellulose acetate or other lower fatty acid ester of cellulose containing 3 to 5 carbon atoms in the acid radical and containing as a plasticizer an organic compound having an ether linkage may be reduced appreciably by incorporating therein paracyclohexyl phenol. The paracyclohexyl phenol, which may be present in an amount of from about 0.05 to 2% by weight based on the weight of the cellulose ester, acts to stabilize the viscosity, strength and other physical characteristics of the thermoplastic compositions during the processing, preparation and use thereof, thereby increasing the commercial utility of said compositions.

Suitable organic compounds having an ether linkage that may be employed as plasticizers in preparing the thermoplastic compositions of this invention are, for example, dimethoxy ethyl phthalate, dibutoxy ethyl phthalate, methoxy ethyl methylphthalate, dimethoxy ethyl adipate, methoxy ethyl stearate, butoxy ethyl stearate, diethylene glycol dipelargonate, and butoxyethyl diglycol carbonate. These plasticizers, which may be present in an amount of from about 5 to 75% by weight, or more, based on the weight of the cellulose ester, maybe employed alone, or in mixtures with each other, or in mixtures with plasticizers of other types. The thermoplastic compositions may contain, in addition to the plasticizer and the paracyclohexyl phenol, dyes, pigments, nacreous materials and other substances having a decorative effect. They may also contain fire retardants, ultra-violet light absorbing substances, and the like.

Where our novel thermoplastic compositions are to be employed as molding powders for the production of injection or compression moldings, or for extrusion operations, the molding powders may be prepared in a manner well known in the art. For example, the organic acid ester of cellulose is mixed with the plasticizer, which may have dissolved therein the paracyclohexyl phenol, and the mixture passed repeatedly through the nip of heated malaxating rolls until it is rendered homogeneous. The mixture is taken off the malaxating rolls in the form of thin sheets, cooled and then broken into particles of a convenient size for use in molding and extrusion devices.

For the production of films and foils, the organic acid ester of cellulose, together with the desired amounts of plasticizer and paracyclohexyl phenol, may be dissolved in a solvent or solvent mixture and the resulting solution deposited on a casting surface. Upon removal of the solvent or solvent mixture, the films or foils set and may be readily stripped from the casting surface.

In addition to cellulose acetate, other organic acid esters of cellulose that may be employed in preparing the thermoplastic compositions of this invention are, for example, cellulose propionate, cellulose acetate-propionate, cellulose butyrate and cellulose acetate-butyrate.

The following examples are given to illustrate this invention further.

Example I

To 100 parts by weight of cellulose propionate, there is added 15 parts by weight of methoxy ethyl stearate having dissolved therein 0.25 parts by weight of paracyclohexyl phenol. The mixture is loaded on malaxating rolls maintained at a temperature of 180° C. and rolled until it is homogeneous, the total loading and rolling time being about 11 minutes, following which the mixture is ground to a powder. The molding powder prepared in this manner has a viscosity measured in acetone-water (98:2) of 51 centipoises, whereas molding powder prepared in the same manner but in the absence of paracyclohexyl phenol has a viscosity of only 44 centipoises.

*Example II*

A sample of the molding powder prepared in Example I is placed in a sealed container and aged for 80 days at a temperature of 60° C. The aged molding powder is molded into a disc, employing a molding temperature of 200° C. and holding the disc at said temperature for a period of 15 minutes. The molded thermoplastic composition has a viscosity in acetone-water (98:2) of 46 centipoises which is only a small decline from its initial viscosity of 51 centipoises, whereas a thermoplastic composition that does not contain paracyclohexyl phenol drops in viscosity from 44 centipoises to 13 centipoises when aged and molded under the same conditions. In addition, the thermoplastic composition that does not contain the paracyclohexyl phenol stabilizer develops a deeper color during aging than does the thermoplastic composition containing the stabilizer.

*Example III*

A sample of molding powder prepared in the manner set forth in Example I, but containing 0.5 parts by weight of paracyclohexyl phenol, is molded into a disc, employing a molding temperature of 200° C. and holding the disc at said temperature for a period of 15 minutes. The molded thermoplastic composition has a yellowness coefficient of 0.48. After an exposure of 1235 hours in a Fadeometer the yellowness coefficient drops to 0.32. A similar disc that does not contain paracyclohexyl phenol has an initial yellowness coefficient of 0.54 and a yellowness coefficient of only 0.15 after 1235 hours in a Fadeometer, showing a much greater sensitivity to the bleaching action of ultra-violet light.

After an exposure of 1,435 hours in a Fadeometer the disc containing paracyclohexyl phenol is free from craze, whereas the disc that does not contain paracyclohexyl phenol has a bad craze.

The yellowness coefficient is determined by dividing the difference between the transmission of the sample at a wave length of 640 m$\mu$ and at a wave length of 440 m$\mu$ by the transmission of the sample at a wave length of 640 m$\mu$. The greater this coefficient the deeper the color. In our copending Application S. No. 126,691, filed on even date herewith, there is disclosed a composition containing cellulose propionate, methoxyethylstearate and paracyclohexyl phenol in such specific proportions as to make the thermoplastic material particularly suitable for use in the manufacture of fountain pens.

It is to be understood that the foregoing detailed description is merely given by way of illustration and that many variations may be made therein without departing from the spirit of our invention.

Having described our invention, what we desire to secure by Letters Patent is:

1. A thermoplastic composition consisting of a lower fatty acid ester of cellulose containing 3 to 5 carbon atoms in the acid radicle and having incorporated therein from about 5 to 75 parts by weight, based on the weight of the lower fatty acid ester of cellulose, of methoxyethylstearate, and, as a plasticizer for the lower fatty acid ester of cellulose, from about 0.05 to 2 parts by weight, based on the weight of the lower fatty acid ester of cellulose, of paracyclohexyl phenol.

2. A thermoplastic composition consisting of cellulose propionate having incorporated therein from about 5 to 75 parts by weight, based on the weigh tof the cellulose propionate, of methoxyethylstearate, and, as a stabilizer for the cellulose propionate, from about 0.05 to 2 parts by weight, based on the weight of the cellulose propionate, of paracyclohexyl phenol.

EDWARD J. WICKSON.
WILLIAM J. MYLES.
WILLIAM B. HORBACK.

REFERENCES CITED

The following references are of record in the file of this patent:

UNITED STATES PATENTS

| Number | Name | Date |
|---|---|---|
| 2,261,140 | Conklin | Nov. 4, 1941 |
| 2,410,685 | Salo | Nov. 5, 1946 |

FOREIGN PATENTS

| Number | Country | Date |
|---|---|---|
| 440,364 | Great Britain | Dec. 30, 1935 |